United States Patent [19]

Segerman

[11] 4,044,446

[45] Aug. 30, 1977

[54] TRAY FOR STRING JEWELRY ITEMS

[76] Inventor: Morton Segerman, 8950 Chickamagua, Tucson, Ariz. 85710

[21] Appl. No.: 654,342

[22] Filed: Feb. 2, 1976

[51] Int. Cl.[2] .............................................. B23P 19/04

[52] U.S. Cl. ....................................................... 29/241

[58] Field of Search ................. 29/241, 433, 200, 203; 206/72; 223/99

[56] References Cited

U.S. PATENT DOCUMENTS

| | | | |
|---|---|---|---|
| 1,215,735 | 2/1917 | Stacey | 29/241 |
| 1,306,337 | 6/1919 | Hayden | 29/241 |
| 3,694,913 | 10/1973 | Draving et al. | 29/241 |

*Primary Examiner*—James L. Jones, Jr.
*Attorney, Agent, or Firm*—Clarence A. O'Brien; Harvey B. Jacobson

[57] ABSTRACT

A horizontal panel member is provided including an upper surface having a plurality of elongated generally parallel upwardly opening grooves formed therein and opening outwardly of one end of the upper surface of the panel member. The panel member comprises a major portion of a tray including an upstanding peripheral curb extending peripherally around all sides of the upper surface and projecting upwardly thereabove, except at the end of the upper surface through which the plurality of grooves open. That portion of the curb extending along the aforementioned upper surface end is spaced outwardly therefrom and terminates upwardly at an elevation substantially horizontally aligned with the bottom of the grooves and thereby defines an upwardly facing guide surface upon which an intermediate portion of an elongated needle may be rested in order to assist alignment of the pointed end of the needle with one of the open ends of the grooves, the grooves being provided to receive a plurality of rows of tubular cylindrical bead-type members or other similar bored items to be strung in the manner of a necklace on a string through the utilization of a needle which may be readily passed through aligned bores formed in bored items cradled in the grooves.

11 Claims, 4 Drawing Figures

TRAY FOR STRING JEWELRY ITEMS

BACKGROUND OF THE INVENTION

Various forms of trays for supporting a plurality of items for sorting purposes and for the purpose of storing, in segregated fashion, different items to be strung have been heretofore designed. In addition, trays provided with generally parallel longitudinally extending and upwardly opening grooves also have heretofore been provided. However, trays of this type specifically designed for ease in stringing bored items such as beads or tubular members with emphasis placed upon the ease in which the items may be strung are few and fail to provide all of the desirable characteristics which enable small bored items such as beads and sleeves to be quickly and readily strung.

Examples of prior devices including some of the general structural and operational features of the instant invention are disclosed in U.S. Pat. Nos. 508,700, 3,628,659, 3,747,756 and D-192,036.

BRIEF DESCRIPTION OF THE INVENTION

The tray of the instant invention includes a plurality of generally parallel upwardly opening V-shaped grooves for supporting, in segregated fashion, a plurality of different types of bored items, such as beads or sleeves, to be strung. The tray is constructed in a manner to enable the pointed end of a needle to be readily positioned for insertion into exposed ends of the bores formed through the items to be strung and is also provided with a recess for temporarily receiving individual board items whenever desired.

The main object of this invention is to provide a tray for supporting groups of segregated different types of bored items to be strung in the forming of jewelry items, such as bracelets and necklaces.

Another object of this invention, in accordance with the immediately preceding object, is to provide a tray for receiving the aforementioned bored items and positioning a plurality of similar types of board items in a manner enabling a needle to be used in the threading process to be readily inserted through one or more of the same type of bored items in a single operation.

Another important object of this invention is to provide a tray including guide structure thereon to assist in positioning a needle being used in the threading operation with the point of the needle precisely aligned with the bores formed through bored items to be threaded and supported from the tray.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
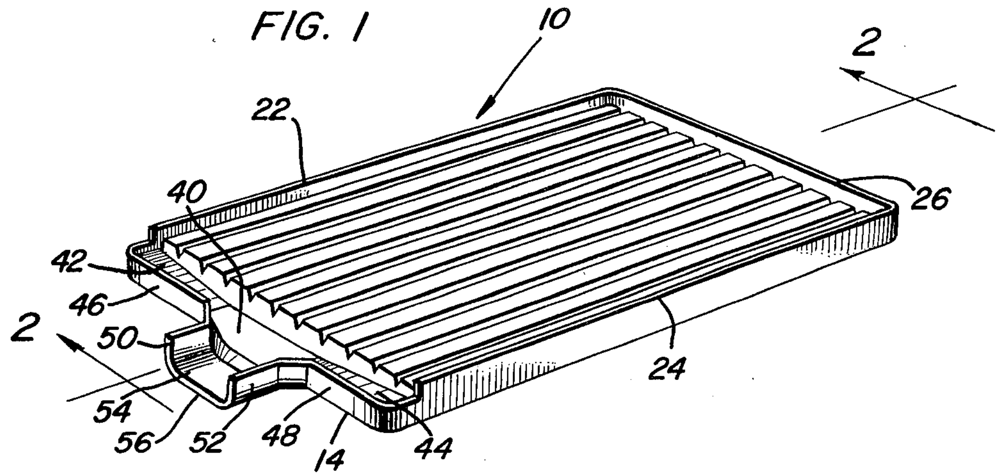
FIG. 1 is a perspective view of the tray of the instant invention.

Referring now more specifically to the drawings, the numeral 10 generally designates the tray of the instant invention. The tray 10 includes an elongated panel 12 having opposite end marginal edge portions 14 and 16 and opposite side marginal portions 18 and 20. Upstanding opposite side curb flanges 22 and 24 extend along and are formed integrally with the marginal portions 18 and 20 and an end curb flange 26 extends along the marginal portion 16, all of the flanges 22, 24 and 26 projecting above the upper surface 28 of the portion of the panel 12 enclosed within the curb flanges 22, 24 and 26. The curb flange 26 interconnects the corresponding ends of the curb flanges 22 and 24 and the marginal portions 22, 24 and 26 also include downwardly projecting skirt flanges 32, 34 and 36 extending therealong and forming downwardly continuations of the curb flanges 22, 24 and 26. The end of the panel 12 remote from the curb flanges 24 and 34 includes a transverse depending flange 38 defining the inner wall of an upwardly opening transversely extending elongated recess 40 including upwardly and outwardly inclined opposite end bottom wall portions 42 and 44. The depending flange 38 defines the end of the upper surface 28 remote from the flanges 26 and 36 and the outer side of the recess 40 is closed by means of a pair of opposite end inwardly directed upstanding curb flanges 46 and 48 including outwardly angulated adjacent end portions spaced apart transversely of the panel 12 and defining an upwardly opening channel 54 whose bottom is closed by an outward extension 56 of the central bottom wall portion 58 of the recess 40.

Figure 2:
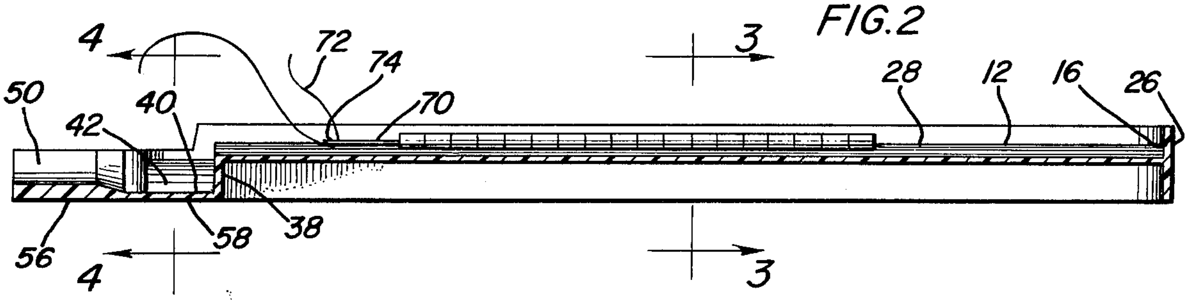
FIG. 2 is an enlarged longitudinal vertical sectional view, taken substantially upon the plane indicated by the section line 2—2 of FIG. 1.
Figure 3:
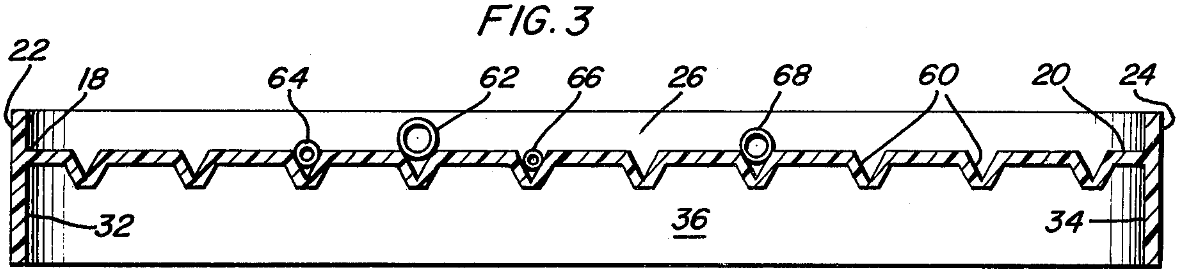
FIG. 3 is a further enlarged transverse sectional view, taken substantially upon the plane indicated by the section line 3—3 of FIG. 2.
Figure 4:
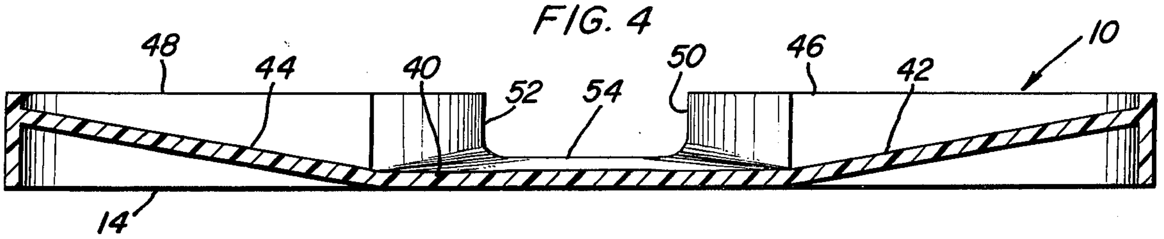
FIG. 4 is an additional further enlarged transverse vertical sectional view, taken substantially upon the plane indicated by the section line 4—4 of FIG. 2.

The panel 12, between the flanges 22, 24, 26 and 38 includes parallel longitudinal corrugations defining upwardly opening parallel grooves 60 extending longitudinally of the panel 12 between the curb flanges 22 and 24. Also, from FIGS. 1 and 2 of the drawings, it will be noted that the upper surfaces of the flanges 46 and 48 are registered with all but the center two grooves 60 and contained in a plane which is spaced between the upper and lower extremities of the grooves 60.

The entire tray 10 may be molded of any suitable plastic material and is of one-piece construction. Further, the tray 10 may be increased in width and include additional grooves 60 and may be increased in length to include longer grooves 60.

In operation, various groups of segregated bored items, such as items 62, 64, 66 and 68 may be arranged in rows within the grooves 60 and the rows of items may be positioned closely adjacent the end of the upper surface 28 adjacent the flange 38 having a string 72 passed through its eye portion 74 may have a mid-portion thereof engaged with the upper guide surface defined by either of the flanges 46 and 48 in order to assist in properly positioning the sharpened point of the needle 70 in axial alignment with a row of items positioned in a corresponding groove 60. Thereafter, the needle 70 may be advanced through the center bores of the desired number of bored items in order to thread that number of selected items onto the string 72. Of course, the process may be repeated over and over again utilizing different numbers of different items 62, 64, 66 and 68 until the desired strung jewelry item is formed.

In the event a mistake is made whereby more than the desired number of a selected item is strung onto the needle 70, the extra item may be readily removed therefrom and deposited into the recess 40 rather than expending unnecessary time required to replace the excess item in the proper groove 60. Still further, after the desired strung jewelry item has been formed and it is desired to return the remaining items 62, 64, 66 and 68 to their respective containers (not shown), the items of each of the grooves may be selectively discharged into the recess 40 upon tilting of the tray 10 while the remaining items are held in place within their respective grooves. Thereafter, the items dislodged from a selected groove 60 may be poured from the recess 40 through the channel 54 into the proper container therefor and the process may be repeated until each row of remaining items has been stored in its proper container.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A tray for stringing jewelry items, said tray comprising a horizontal panel member including an upper surface having a plurality of generally parallel elongated upwardly opening grooves formed therein and opening outwardly of one end of said surface, and means defining an upwardly facing guide surface extending transversely of said grooves, spaced endwise outwardly of said one end of said upper surface and generally horizontally aligned with said grooves, said guide surface including portions thereof spaced endwise outwardly of and generally horizontally aligned with at least two of said grooves, said panel member including an upstanding curb projecting above said surface at the ends of said grooves remote from said guide surface closing said remote ends of said grooves.

2. The combination of claim 1 wherein said grooves are V-shaped in cross section.

3. The combination of claim 1 wherein said panel member includes opposite end transverse marginal portions, said curb extending along one of said end marginal portions.

4. The combination of claim 3 wherein said guide surface extends along the other of said end marginal portion.

5. The combination of claim 4 wherein said panel member includes means defining an elongated transversely extending upwardly opening elongated recess between said one end of said upper surface and said guide surface.

6. The combination of claim 5 wherein said tray includes means defining an upwardly opening elongated channel, open at its opposite ends, generally paralleling said grooves, and opening inwardly into the side of said recess remote from said surface centrally intermediate the opposite ends of said recess.

7. The combination of claim 6 wherein said grooves in said upper surface include a plurality of grooves longitudinally registered with said channel and a plurality of grooves disposed on remote sides of parallel upright planes extending along the remote sides of said channel, said portions of said guide surface being disposed on the remote sides of said planes.

8. A tray for stringing jewelry items, said tray comprising a horizontal panel member including an upper surface having opposite ends and a plurality of generally parallel elongated and upwardly opening grooves formed therein and extending longitudinally thereof, one set of corresponding ends of said grooves adjacent one end of said upper surface being closed, said tray defining, at the other end of said upper surface, an elongated depressed upwardly opening recess extending transversely of said grooves and into one longitudinal side of which recess the other set of corresponding groove ends open, the other longitudinal side of said recess being defined by an upstanding wall portion of said tray including upper surface portions generally horizontally aligned with said other set of corresponding ends of said grooves.

9. The combination of claim 8 wherein said tray defines an upwardly opening channel generally paralleling said upper surface and including a first end opening into said recess and a second end opening through a peripheral portion of said tray.

10. The combination of claim 9 wherein said channel opens through said upstanding wall portion.

11. The combination of claim 8 wherein said tray includes an upwardly projecting curve extending peripherally about and projecting above said upper surface to the exclusion of those portions of said upper surface extending along said recess.

* * * * *